United States Patent
Fangsheng

(10) Patent No.: US 9,733,631 B2
(45) Date of Patent: Aug. 15, 2017

(54) SYSTEM AND METHOD FOR CONTROLLING A PLUMBING FIXTURE

(71) Applicant: Shanghai Kohler Electronics, LTD., Shanghai (CN)

(72) Inventor: Yuan Fangsheng, Shanghai (CN)

(73) Assignee: Shanghai Kohler Electronics, LTD. (CN)

( * ) Notice: Subject to any disclaimer, the term of this patent is extended or adjusted under 35 U.S.C. 154(b) by 552 days.

(21) Appl. No.: 14/278,387

(22) Filed: May 15, 2014

(65) Prior Publication Data

US 2014/0358258 A1    Dec. 4, 2014

(30) Foreign Application Priority Data

May 15, 2013 (CN) .......................... 2013 1 0180456

(51) Int. Cl.
| | | |
|---|---|---|
| G06F 17/00 | (2006.01) | |
| G05B 15/02 | (2006.01) | |
| G05B 19/042 | (2006.01) | |
| A47K 17/00 | (2006.01) | |
| E03C 1/05 | (2006.01) | |

(52) U.S. Cl.
CPC .......... *G05B 15/02* (2013.01); *G05B 19/042* (2013.01); *A47K 17/00* (2013.01); *E03C 1/057* (2013.01)

(58) Field of Classification Search
None
See application file for complete search history.

(56) References Cited

U.S. PATENT DOCUMENTS

| | | | | |
|---|---|---|---|---|
| 4,156,134 A | * | 5/1979 | Minner | H03J 9/06 250/214 B |
| 4,211,998 A | * | 7/1980 | Junginger | A61G 13/02 340/13.36 |
| 7,227,444 B2 | * | 6/2007 | Fitzgibbon | G08C 17/02 340/5.24 |
| 2012/0019400 A1 | * | 1/2012 | Patel | G08C 17/00 340/870.15 |
| 2013/0170839 A1 | | 7/2013 | Yuan | |
| 2014/0224350 A1 | * | 8/2014 | Patel | E03B 7/071 137/78.1 |
| 2014/0379145 A1 | * | 12/2014 | Allard, III | G05D 7/0617 700/282 |
| 2015/0189724 A1 | * | 7/2015 | Karc | H05B 37/0272 315/149 |

* cited by examiner

*Primary Examiner* — Philip Wang
(74) *Attorney, Agent, or Firm* — Foley & Lardner LLP

(57) ABSTRACT

The present application relates to a system and method for controlling a plumbing fixture. The system includes a Bluetooth receiver module configured to receive a wireless signal from mobile equipment, a micro control unit in electrical communication with the Bluetooth receiver module, an asynchronous receiver and transmitter in electrical communication with the micro control unit, and a processor in electrical communication with the micro control unit and the plumbing fixture. The Bluetooth receiver module is configured to receive one or more wireless control speech data packets from mobile equipment, convert the one or more wireless control speech data packets into one or more digital signals, and transmit the one or more digital signals to the micro control unit. The micro control unit is configured to control one or more functions associated with the plumbing fixture in response to the one or more digital signals.

17 Claims, 2 Drawing Sheets

SYSTEM AND METHOD FOR CONTROLLING A PLUMBING FIXTURE

CROSS-REFERENCE TO RELATED APPLICATION

This application claims the benefit of and priority to Chinese Patent Application No. 201310180456.6, filed May 15, 2013, which is incorporated by reference herein in its entirety.

BACKGROUND

The present application relates to a plumbing fixture and, in particular, to a system and method for controlling a plumbing fixture.

Traditional plumbing fixtures include primary functions such as sanitation and cleaning. However, with the improvement in the standard of living, modern plumbing fixtures now include increased functionality. For example, modern plumbing fixtures include multiple functions to accommodate secondary needs such as health care, personal enjoyment, and entertainment.

With the increased emphasis on multi-functional plumbing fixtures, there is a need for improved controls to perform those functions. Typical methods for controlling the functions of a plumbing fixture include the use of mechanical buttons or touch sensors installed on the plumbing fixture. For example, a user can press a button or touch a sensor so that the plumbing fixture can perform a corresponding function.

However, using mechanical buttons or touch sensors installed on plumbing fixtures can be undesirable because users must turn their bodies to see/touch the desired button or sensor while using the plumbing fixture. Therefore, it can be inconvenient to use plumbing fixtures having mechanical buttons or touch sensors. Additionally, some functions (such as ultra violet sterilization) should be performed when the plumbing fixture is not being used. However, with traditional plumbing fixtures, a user should be physically present to activate/initiate this function (e.g., by actuating a mechanical button or a touch sensor). This is inconvenient for a user because the plumbing fixture cannot be utilized until sterilization is completed.

Therefore, there is a need for a simpler, more convenient method and system for controlling various functions associated with modern plumbing fixtures.

SUMMARY

To solve the above-mentioned problems, the present application provides for a system and method that allows for improved control of various functions associated with a plumbing fixture.

In one embodiment, the present application relates to a control system for a plumbing fixture. The control system includes a Bluetooth receiver module configured to receive a wireless signal from mobile equipment. The system also includes a micro control unit in electrical communication with the Bluetooth receiver module, an asynchronous receiver and transmitter in electrical communication with the micro control unit, and a processor in electrical communication with the micro control unit and the plumbing fixture. The Bluetooth receiver module is configured to receive one or more wireless control speech data packets from mobile equipment, convert the one or more wireless control speech data packets into one or more digital signals, and transmit the one or more digital signals to the micro control unit. The control system is configured to control one or more functions associated with the plumbing fixture in response to the one or more digital signals.

In another embodiment, the present application relates to a plumbing fixture assembly. The assembly includes a plumbing fixture and a control system operatively connected to the plumbing fixture. The control system is configured to control one or more functions associated with the plumbing fixture in response to one or more wireless control speech data packets received from mobile equipment.

In yet another embodiment, the present application relates to a method for controlling a plumbing fixture. The method includes providing a control system operatively connected to the plumbing fixture. The control system includes a Bluetooth receiver module configured to receive a wireless signal from mobile equipment, a micro control unit in electrical communication with the Bluetooth receiver module, an asynchronous receiver and transmitter in electrical communication with the micro control unit, and a processor in electrical communication with the micro control unit and the plumbing fixture. The method further includes receiving one or more wireless control speech data packets from the mobile equipment, and performing one or more functions associated with the plumbing fixture which correspond to the one or more wireless control speech data packets.

The plumbing fixture control method in the present application involves the following processes: a) Client software is installed on the mobile equipment with a Bluetooth transmitter module. b) By running the client software, the Bluetooth transmitter module transmits one or more wireless control speech data packets to the plumbing fixture installed with a Bluetooth receiver module to control the plumbing fixture performing one or more functions accordingly. c) The Bluetooth receiver module receives the wireless control speech data packet(s). d) The Bluetooth receiver module responds to the received wireless control speech data packet(s) and the plumbing fixture performs one or more functions accordingly.

The interface of the client software may be displayed on the display of the mobile equipment and process b) is as follows: The client software responds to the touch of a soft key on the interface and the Bluetooth transmitter module transmits one or more wireless control speech data packets to control the plumbing fixture performing one or more functions accordingly.

The plumbing fixture includes a micro control unit, a processor, and a universal asynchronous receiver/transmitter, the Bluetooth receiver module includes a decoder, and process d) is as follows: The decoder decodes the received wireless control speech data packet(s), converts the speech data packet(s) into digital signal(s), and transmits the digital signal(s) to the micro control unit; the micro control unit analyzes the digital signal(s) to obtain the specific control command(s); the universal asynchronous receiver/transmitter transmits the control command(s) to the processor; and the plumbing fixture performs one or more functions accordingly.

The plumbing fixture control system includes mobile equipment, installed with a Bluetooth transmitter module (which is used to transmit one or more wireless control speech data packets) and client software, and a Bluetooth receiver module installed in a plumbing fixture to receive one or more wireless control speech data packets from the Bluetooth transmitter module. When the client software is run, the Bluetooth transmitter module transmits one or more wireless control speech data packets to the plumbing fixture to control the plumbing fixture performing one or more functions accordingly. It is preferred that the interface of the client software is displayed on the display of the mobile equipment and the touch of a soft key on the interface of the client software enables the Bluetooth transmitter module to transmit one or more wireless control speech data packets to the plumbing fixture to control the plumbing fixture performing one or more functions accordingly.

The plumbing fixture control system may include the micro control unit, the processor, and the universal asynchronous receiver/transmitter of a plumbing fixture, the Bluetooth receiver module includes a decoder which decodes the received wireless control speech data packet(s), converts the speech data packet(s) into digital signal(s), and transmits the digital signal(s) to the micro control unit, the micro control unit analyzes the digital signal(s) to obtain the specific control command(s), and the universal asynchronous receiver/transmitter transmits the control command(s) to the processor so that the plumbing fixture performs one or more functions accordingly.

In the plumbing fixture control method and plumbing fixture control system in the present application, it is preferred that (1) a wireless control speech data packet consists of multiple basic data units arranged in different orders while basic data units are signals with a given time length but different frequencies, (2) the plumbing fixture is a toilet and the mobile equipment is a mobile phone, tablet computer, or portable media player, (3) one or more functions can be selected from the group comprising massage, heating, drying, flushing, backlight, ultra violet sterilization, and music entertainment.

In this manner, it is simpler and more convenient to use mobile equipment to control various functions associated with plumbing fixtures. Furthermore, mobile equipment installed with a non-open source operating system or an operating system with digital signal transmission restricted by a license can be used to control a plumbing fixture because the control system and method disclosed herein uses a Bluetooth-based speech data transmission, instead of direct digital signal transmission. By transmitting speech data packets, the present application can achieve the same effect as it would by transmitting digital signals.

DETAILED DESCRIPTION

Figure 1:
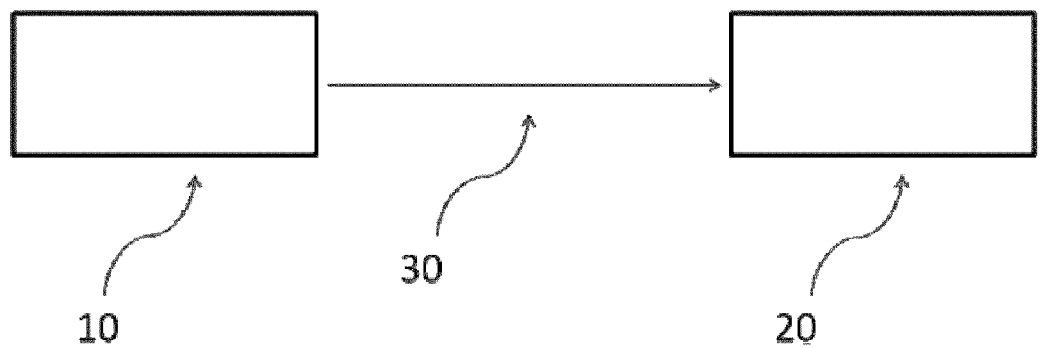
FIG. 1 is a schematic diagram of wireless control speech data packets being transmitted between a plumbing fixture and mobile equipment according to an exemplary embodiment.

According to an exemplary embodiment shown in FIG. 1, wireless communication is performed between mobile equipment 10 and the plumbing fixture 20 to control a function of the plumbing fixture 20. By transmitting a wireless control speech data packet 30 to the plumbing fixture 20, the mobile equipment 10 can remotely control the plumbing fixture 20. According to an exemplary embodiment, the mobile equipment 10 and the plumbing fixture 20 communicate with each other by sending and receiving Bluetooth speech data packets. The advantage of communication via Bluetooth speech data packets is that mobile equipment installed with either an open source or non-open source operating system can be used to control the plumbing fixture. Generally speaking, non-open source operating systems have restrictions for transmitting digital signals, but not for transmitting Bluetooth speech signals. According to various exemplary embodiments, mobile equipment 10 includes, but is not limited to, a mobile phone, a tablet computer, and a portable media player. The plumbing fixture 20, for example, can be a toilet.

Figure 2:
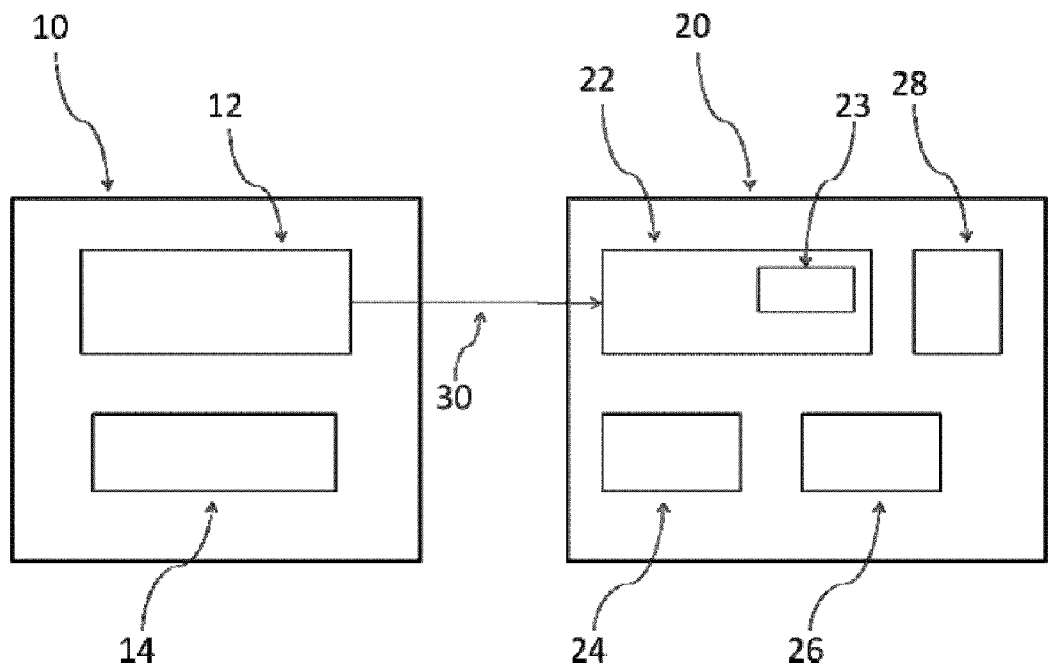
FIG. 2 is a block diagram of a plumbing fixture control system according to an exemplary embodiment.

FIG. 2 is a block diagram of a plumbing fixture control system according to an exemplary embodiment. As shown in FIG. 2, the mobile equipment 10 contains a built-in Bluetooth transmitter module 12 that is installed with client software. The running of the client software enables the Bluetooth transmitter module 12 to send a wireless control speech data packet 30 to the plumbing fixture 20 to control a function of the plumbing fixture. Thus, the mobile equipment 10 can control the plumbing fixture 20 to perform a function that corresponds to the wireless control speech data packet 30.

According to an exemplary embodiment, the graphical user interface 14 of the client software is displayed on the user display of the mobile equipment. The style of the software interface 14 can be similar to the user interface on a common remote controller. The user can perform a relevant control operation by touching a soft key/button on the software interface 14. Generally speaking, popular mobile equipment typically has a large touch screen. Therefore, it is very convenient to run the software by directly touching a soft key/button on the software interface 14. Different soft keys/buttons on the software interface 14 correspond to different wireless control speech data packets 30. The different wireless control speech data packets 30 represent different commands for controlling various functions associated with the plumbing fixture 20 (such as a toilet). For example, various functions can include, massaging, heating, drying, flushing, backlighting, ultra violet sterilization, and music entertainment.

According to an exemplary embodiment, the plumbing fixture 20 includes a Bluetooth receiver module 22 to receive wireless control speech data packets from the Bluetooth transmitter module 12 on the mobile equipment 10. The plumbing fixture 20 additionally includes a micro control unit (MCU) 24, a universal asynchronous receiver/transmitter (UART) 26, and a processor 28. The Bluetooth receiver module 22 includes a decoder 23, which decodes the wireless control speech data packet 30 received by the Bluetooth receiver module 22, converts the wireless control speech data packet into a digital signal, and transmits the digital signal to the MCU 24. The MCU 24 analyzes the digital signal to obtain a control command which aims at controlling the plumbing fixture 20 to perform a corresponding function. For example, the control command from the MCU 24 is transmitted via the UART 26 to the processor 28 so that the plumbing fixture 20 can perform a corresponding function.

Figure 3:
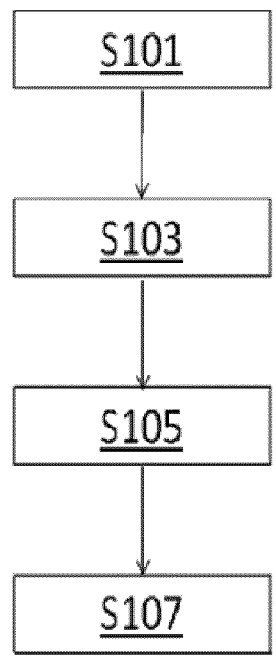
FIG. 3 is a flow chart of a control method for a plumbing fixture according to an exemplary embodiment.

FIG. 3 is a flow chart of an exemplary control method in accordance with the control system of FIG. 2. As shown in FIG. 3, in process step S101, client software is installed on the mobile equipment 10 with a Bluetooth transmitter module 12. In process step S103, the client software installed in process S101 is run by touching a soft key/button on the client software interface 14 so that the Bluetooth transmitter module 12 can transmit a wireless control speech data packet 30 to the plumbing fixture 20 installed with the Bluetooth receiver module 22. In process step S105, the Bluetooth receiver module 22 of the plumbing fixture 20 receives the wireless control speech data packet 30 transmitted in process step S103. In process step S107, the plumbing fixture 20 performs a corresponding function according to the wireless control speech data packet 30 received in process step S105.

Figure 4:
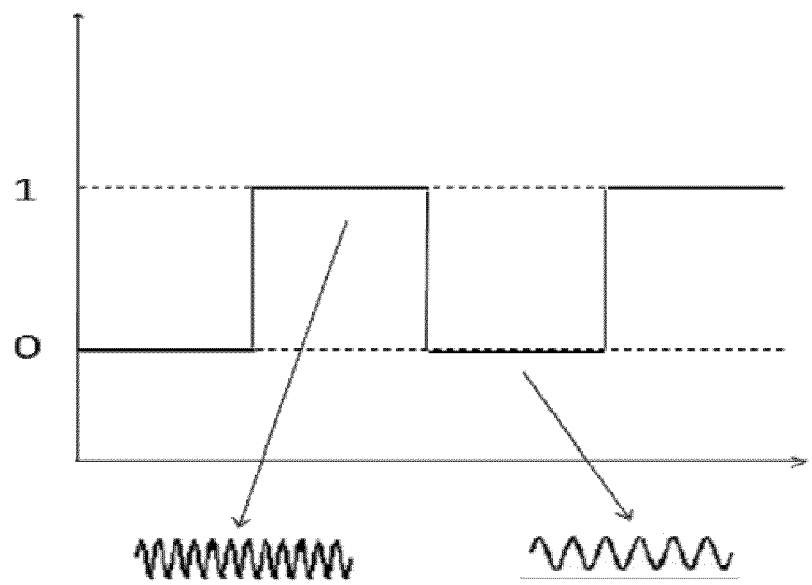
FIG. 4 is a schematic diagram of basic data units in a wireless control speech data packet according to an exemplary embodiment.

FIG. 4 is a schematic diagram of basic data units in a wireless control speech data packet according to an exemplary embodiment. As previously described, touching/activating different soft keys/buttons on the software interface 14 of the client software enables the Bluetooth transmitter module 12 on the mobile equipment 10 to transmit different wireless control speech data packets 30. The different wireless control speech data packets 30 include basic data units arranged in different orders. As shown in FIG. 4, basic data units are signals with a given time length but different frequencies. For instance, a high-frequency signal represents 1 while a low-frequency signal represents 0. Multiple wireless control speech data packets 30 formed by basic data units arranged in different orders represent different commands. For example, the following control commands/functions are represented by the following data units respectively: flushing (00110001); heating (00110010); and drying (00110011).

According to an exemplary embodiment, specific frequencies can be selected as criteria to measure the high and low levels of signals. For example, 2200-Hz signals can represent 1, while 1200-Hz signals can represent 0. Of course, skilled persons in the field will appreciate using a low-frequency signal to represent 1 and a high-frequency signal to represent 0.

The scope of the present application is not limited to the embodiment described above. Variations and modifications may fall within the scope of the claims.

What is claimed is:

1. A control system for a plumbing fixture comprising:
a wireless receiver module configured to receive a wireless signal from mobile equipment;
a circuit in electrical communication with the wireless receiver module; and
a receiver and transmitter in electrical communication with the circuit;
wherein the wireless receiver module is configured to receive one or more wireless control speech data packets from mobile equipment, convert the one or more wireless control speech data packets into one or more digital signals, and transmit the one or more digital signals to the circuit;
wherein the circuit is configured to control one or more functions associated with the plumbing fixture in response to the one or more digital signals, wherein the one or more functions are selected from the group consisting of massaging, heating, drying, flushing, backlighting, and ultraviolet sterilization; and
wherein the one or more wireless control speech data packets are formed by basic data units arranged in different orders that correspond to the one or more functions.

2. The control system of claim 1, wherein wireless control speech data is the only type of data used by the control system and the mobile equipment to receive plumbing fixture control instructions from the mobile equipment, whereby mobile phones that have data communications restrictions but allow speech data transmission are operable with the control system for the plumbing fixture, wherein information received as wireless control speech data packets is caused to be transmitted in response to a soft button press or software scheduling on the mobile phone.

3. The control system of claim 2, wherein the wireless receiver module is a Bluetooth receiver module and wherein the Bluetooth receiver module includes a decoder configured to decode the one or more wireless control speech data packets; wherein the decoder is further configured to convert the one or more wireless control speech data packets into the one or more digital signals and to transmit the one or more digital signals to the circuit.

4. The control system of claim 3 wherein the circuit is configured to receive the one or more digital signals from the Bluetooth receiver module, and to transmit a corresponding control command to a processor via the receiver and transmitter to control a function of the plumbing fixture.

5. The control system of claim 4 wherein the one or more wireless control speech data packets is transmitted to the Bluetooth receiver module via a software interface installed on mobile equipment.

6. The control system of claim 1 wherein each of the basic data units is a signal having a given time length and frequency.

7. The control system of claim 6 wherein the signal is at least one of a high frequency signal and a low frequency signal.

8. A plumbing fixture assembly comprising:
a plumbing fixture; and
a control system operatively connected to the plumbing fixture;
wherein the control system is configured to control one or more functions associated with the plumbing fixture in response to one or more wireless control speech data packets received from mobile equipment;
wherein the one or more functions are selected from the group consisting of massaging, heating, drying, flushing, backlighting, and ultraviolet sterilization; and
wherein the one or more wireless control speech data packets are formed by basic data units arranged in different orders that correspond to the one or more functions.

9. The plumbing fixture assembly of claim 8 wherein the control system comprises a wireless receiver module and a circuit operatively connected to the wireless receiver module; and
wherein the wireless receiver module includes a decoder configured to receive one or more wireless control speech data packets, convert the one or more wireless control speech data packets into one or more digital signals, and transmit the one or more digital signals to the circuit.

10. The plumbing fixture assembly of claim 9 wherein the control system further comprises a receiver and transmitter in electrical communication with the circuit; and
wherein the receiver and transmitter is configured to receive the one or more digital signals from the wireless receiver module and to transmit a corresponding control command.

11. The plumbing fixture assembly of claim 10 wherein the control system further comprises a processor operatively connected to the plumbing fixture; and
wherein the processor is configured to receive the control command from the receiver and transmitter to control one or more functions associated with the plumbing fixture.

12. The plumbing fixture assembly of claim 11 wherein the one or more wireless control speech data packets is transmitted to the wireless receiver module via a software interface installed on mobile equipment.

13. The plumbing fixture assembly of claim 8 wherein each of the basic data units is a signal having a given time length and frequency.

14. The plumbing fixture assembly of claim 13 wherein the signal is at least one of a high frequency signal and a low frequency signal.

15. A method for controlling a plumbing fixture comprising:
   providing a control system operatively connected to the plumbing fixture, the control system comprising:
   a wireless receiver module configured to receive a wireless signal from mobile equipment;
   a circuit in electrical communication with the wireless receiver module; and
   a receiver and transmitter in electrical communication with the circuit;
   receiving one or more wireless control speech data packets from the mobile equipment; and
   performing one or more functions associated with the plumbing fixture which correspond to the one or more wireless control speech data packets;
   wherein the one or more functions are selected from the group consisting of massaging, heating, drying, flushing, backlighting, and ultraviolet sterilization; and
   wherein the one or more wireless control speech data packets are formed by basic data units arranged in different orders that correspond to the one or more functions.

16. The method of claim 15 further comprising:
   converting the one or more wireless control speech data packets into one or more digital signals;
   transmitting the one or more digital signals to the circuit;
   analyzing the one or more digital signals to generate a control command; and
   transmitting the control command to the plumbing fixture.

17. The method of claim 16 wherein converting the one or more wireless control speech data packets includes decoding the one or more wireless control speech data packets using a decoder included in the wireless receiver module.

* * * * *

UNITED STATES PATENT AND TRADEMARK OFFICE
CERTIFICATE OF CORRECTION

PATENT NO. : 9,733,631 B2  Page 1 of 1
APPLICATION NO. : 14/278387
DATED : August 15, 2017
INVENTOR(S) : Yuan Fangsheng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this
Twenty-fifth Day of September, 2018

Andrei Iancu
*Director of the United States Patent and Trademark Office*